Aug. 2, 1960

J. A. McDOUGALL 2,947,569

POWER WINDOW REGULATOR

Filed March 7, 1958

J.A. McDOUGALL
INVENTOR.

BY E.C. McRae
J.R. Faulkner
J.H. Oster

ATTORNEYS

J.A. McDOUGALL
INVENTOR.

BY E.C. McRae
J.R. Faulkner
J.H. Oster
ATTORNEYS

United States Patent Office 2,947,569
Patented Aug. 2, 1960

2,947,569

POWER WINDOW REGULATOR

John A. McDougall, Garden City, Mich., assignor to Ford Motor Company, Dearborn, Mich., a corporation of Delaware Filed Mar. 7, 1958, Ser. No. 719,878

6 Claims. (Cl. 296—44)

This invention relates generally to window operating and guiding means for motor vehicles, and has particular reference to mechanism adapted to control the movement of a power operated vehicle window in a pre-determined direction.

The contemporary trend in motor vehicle body design is one in which emphasis is being placed on increasing the glass area above the belt line. This trend has been evidenced by the elimination or the reduction to an absolute minimum size of the conventional body pillars above the belt line. It is expected that the next major body design evolution, one that is presently in its preliminary stages of introduction, will be the universal adoption of curved window glass in the side panels of the vehicle body, following the pattern set by the adoption of curved or wrap-around windshields and rear windows. Yet, it is still required that the side windows be mounted within the body shell so that they may be raised and lowered as desired.

It is an object of the present invention to provide a mechanism for supporting and operating a window panel which is adapted to overcome any of the limitations which may be imposed by the vehicle body design conditions. More particularly, the present invention embraces embodiments of such mechanism which, in general, comprise a support structure secured to the movable panel at its lower edge. Within the window well into which the panel is adapted to be retracted, there is provided a control means for controlling the path of movement of said panel between the window well and the window opening, the control means comprising at least one guide member adapted to impose a controlled movement pattern to said panel. The support structure is suitably coupled to the control means and also has mounted thereon a motor means, the motor means being supported for movement longitudinally of the panel. The guide member is provided with drive engageable means engaged by drive means coupled to said motor, whereby the panel and the motor mounted therebeneath are movable along the guide member to raise or lower the window, as desired, into and out of the window well.

Other objects and advantages of the invention will be made more apparent as this description proceeds, particularly when considered in connection with the accompanying drawings, wherein.

Figure 1A:
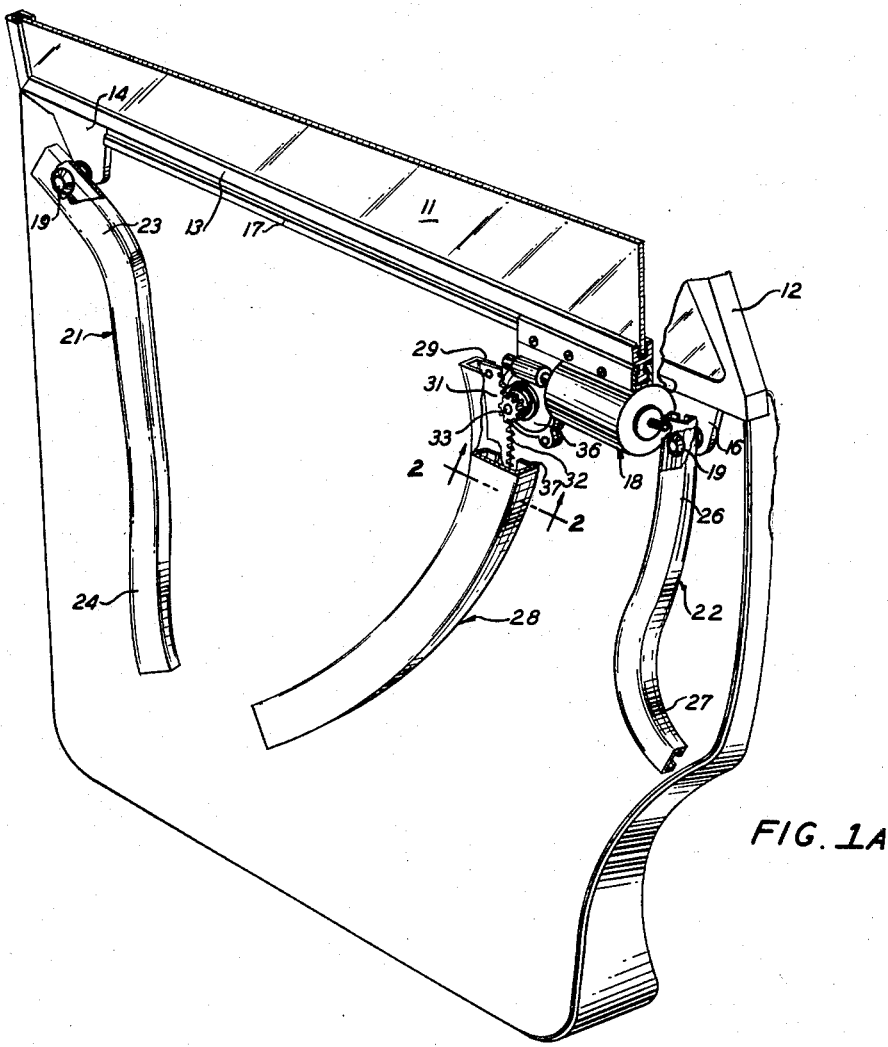
Fig. 1a is a perspective view of a vehicle window panel and window operating mechanism incorporating one embodiment of the present invention.

Referring now to the embodiment of the invention illustrated in Figs. 1a, b, c, and d, and 2, there is shown in Fig. 1a a fragmentary portion of a motor vehicle transparent panel or window glass 11 encompassed by a frame 12. The lower horizontal rail portion 13 of the frame 12 is provided at each end thereof with depending leg portions 14 and 16, respectively. Extending longitudinally beneath the frame 12, and preferably integral therewith, is an inverted T-shaped track or rail 17. Slidably suspended from the track or rail 17 is a reversible electric motor and reduction gear unit, generally designated 18.

In the present embodiment, the forward depending leg portion 14 is provided with a roller 19 slidably received within a generally vertically extending guideway or guide track 21. Similarly, the rear depending leg portion 16 is provided with a roller 19 slidably received within a second generally vertically extending guideway or guide track 22. Both guideways or guide tracks are of similar generally channel-shaped cross section and are mounted in a suitable manner on the vehicle body within the window well beneath the window opening.

The guideway or guide track 21 is provided with an upper portion 23 inclined toward a horizontal position, the remaining portion 24 thereof being substantially straight but tilted slightly from a true vertical position. The rear guideway or guide track 22 upper portion 26 is also substantially straight with the longitudinal axis thereof substantially paralleling the longitudinal axis of the lower portion 24 of the guideway or guide track 21. The lower portion 27 of the guideway 22 is turned rearwardly toward a horizontal position.

Interposed between the forward guideway or guide track 21 and the rear guideway or guide track 22 is a third guideway or guide track 28. The guideway or guide track 28 is substantially channel-shaped. It extends in a substantially up and down direction but is uniformly curved from the top toward the bottom in a forwardly extending direction, and is secured to the vehicle body as were the outer two guideways or guide tracks. In addition, the guideway or guide track 28 is provided along the forward flange 29 of the channel opening therein with a plate 31 provided with rack teeth 32. The rack teeth 32 are engaged by a pinion 33 keyed to the shaft 34 of the reduction gear assembly 36 of the motor and gear unit 18.

Figure 2:
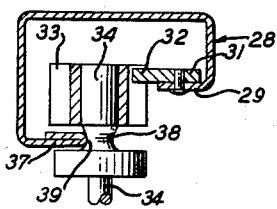
Fig. 2 is a sectional view taken substantially through line 2—2 of Fig. 1a, looking in the direction of the arrows.

It will be noted that the plate 31 is secured to the inner side of the flange 29. The opposite or rear flange 37 is parallel thereto but is spaced outwardly of the flange 29 and is adapted to be interposed between the pinion 33 and the housing of the reduction gear 36. The pinion 33 is provided with a roller or groove portion 38 adapted to bear against the rolled edge 39 of the flange 37, as best seen in Fig. 2.

Figure 1B:
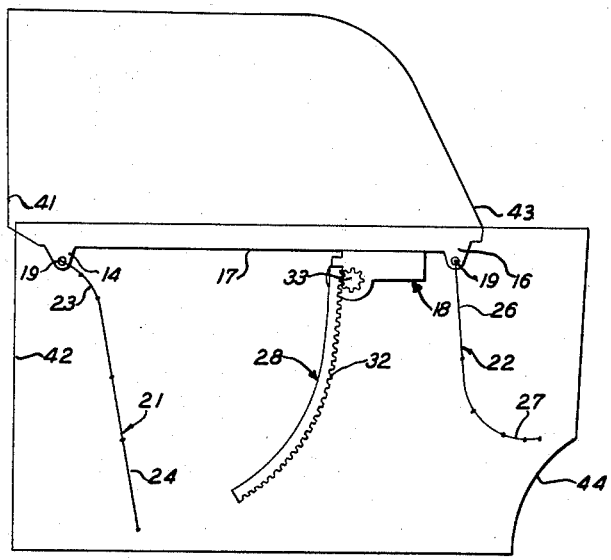
Figs. 1b, 1c and 1d are diagrammatic views showing the position of the window panel in its raised, centered and lowered positions.

Referring now to Figs. 1b, c and d, the movement pattern of the window panel 11 may be explained as follows: Since the forward end 41 of the window panel overlies the body pillar, represented by the line 42, the movement must be such that the window panel is moved rearwardly before it is dropped into the window well.

Upon rotation of the pinion 33 in a clockwise direction as viewed in Fig. 1b, the rear end 43 of the window will move downwardly relatively to the vertical portion 26 of the guide track 22. The forward end 41 of the window will momentarily dwell relative to the upper end 23 of the guide track 21. As the rear end 43 of the panel continues its vertical descent, the front end 41 will begin to move rearwardly and slightly downwardly along the upper end 23 of the guide track 21. In the meanwhile, the pinion 33 will be travelling downwardly along the rack teeth 32.

Figure 1C:
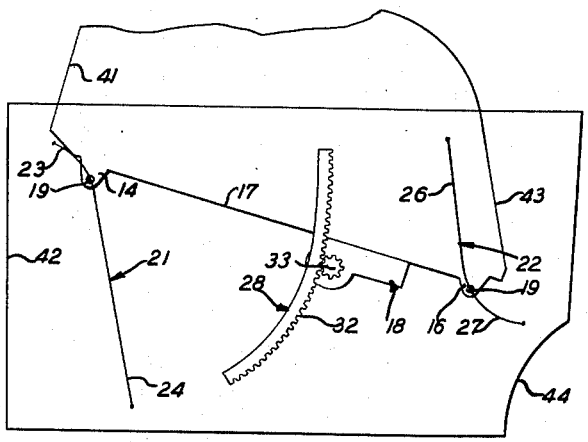

When the position shown in Fig. 1c is reached, which might be considered the center or midpoint position, there is a substantial reversal of the relative rate of downward movement of the two ends of the window panel. The forward end 41 is now in the approach to the substantially straight portion 24 of the guide track 21 and the rear end 43 is in the approach to the curved portion 27 of the guide track 22. Thus, the forward end 41 of the window panel begins to descend rapidly while the rear end 42 reached a position in which it continues to move only slightly rearwardly and downwardly.

Between the Fig. 1c position and the final Fig. 1d position the forward end 41 of the window is dropped below the level of its rear end 43. The curved line 44 represents the vehicle body wheel housing. It is because of this wheel housing that it is necessary to limit the downward movement of the rear end 43 of the window panel.

It will be noted that as the window travelled downwardly, the position of the motor and gear unit 18 changed relatively to the window panel. As was described, the motor and gear unit 18 is slidable on the track 17. The curvature of the guide track 28 is such that the motor is caused to move to that side of the vertical centerline of the window panel corresponding to the end of the panel which is to be lifted most rapidly. For example, referring to Figs. 1d, 1c and 1b, in that order, it will be noted that at the start of the raising activity, the motor and gear unit 18 is located near the forward end 41 of the window panel. As the window is raised it is this end of the window which requires the most lift effort since the connection between the end 43 of the panel and the track portion 27 acts as a fulcrum about which the panel is pivoted in its initial stages of upward movement.

In the Fig. 1c position, there is a momentary lull in the lifting action and the motor and gear unit 18 is positioned so that the line of action or contact point between the pinion 33 and rack 32 lies substantially on the longitudinal center of the panel 11. Beyond the Fig. 1c position, the pivot fulcrum shifts to the connection between the forward end 41 of the panel and the upper portion 23 of the guide track 21. Now, most of the lifting action takes place on the rear end 43 of the window panel and the motor and gear unit 18, accordingly, is now positioned nearest to this end of the panel.

Figure 3:
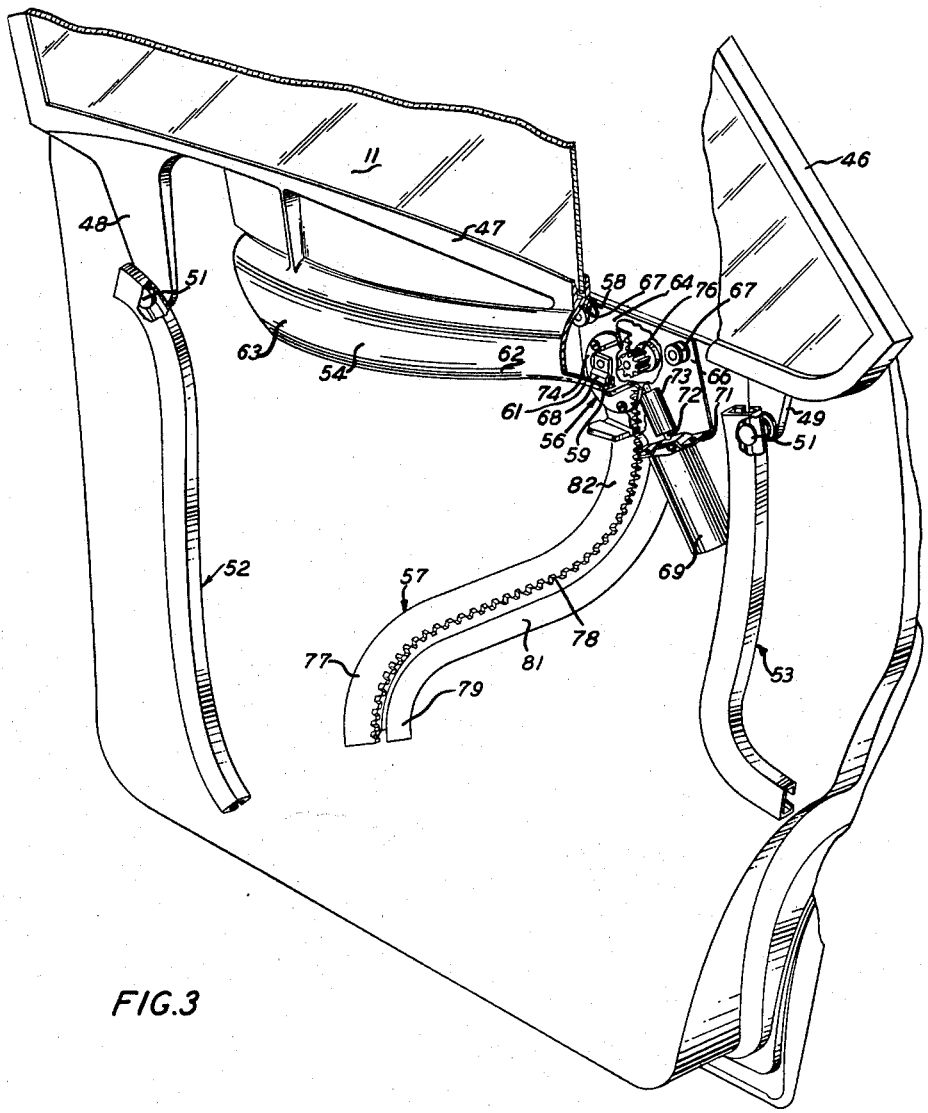
Fig. 3 is a perspective view in part similar to Fig. 1a illustrating a second embodiment of the present invention.

The embodiment of the present invention illustrated in Fig. 3 is similar in many respects to the previously described embodiment. The window panel 11 is encompassed by a frame 46 having a lower rail portion 47. The lower rail portion is provided with depending leg portions 48 and 49 adapted to be coupled by rollers 51 to guide tracks 52 and 53. The guide tracks 52 and 53 are substantially similar to the previously described guide tracks 21 and 22.

In the present embodiment the track member 54 supporting the motor and gear unit 56 and the guide track 57 operatively associated with the motor unit are more complicated, for reasons to be explained. The track member 54, corresponding in function to the previously described track member or rail 17, comprises a channel-shaped member which may be formed integral with the lower rail 47. The track member 54 is formed with an upper downwardly extending rail 58 which is cooperatively opposed by a lower upwardly extending rail 59. It will be noted that the rear end 61 of the track member 57 is substantially horizontal. The center section 62 curves away from the frame lower rail 47 and terminates in a forward section 63 which is in horizontal spaced relationship to the frame lower rail.

The motor and gear unit 56 is supported on a bracket or flanged member 64. The main or vertical plate 66 of the bracket extends vertically and is provided at its upper edge with a pair of horizontally spaced grooved rollers 67 adapted to engage the rail 59. Near the lower left hand corner thereof, the plate 66 is provided with a slide member 68 adapted to hook over the lower rail 59.

The motor 69 of the motor and gear unit 56 is suspended from beneath the flange portion 71 of the bracket 64, the motor shaft 72 and coupling 73 extending upwardly between the rail 59 and bracket plate 66. The coupling 73 couples the motor shaft to the reduction gear unit, of which only a portion of the housing 74 is shown. The pinion 76 is on a shaft (not shown) which projects through the plate 66. The drawing is shown as a cut-away view at this portion since the pinion 76 would normally not be visible when viewed as in Fig. 3.

The guide track 57 is substantially channel shaped and is provided at the front face thereof with a rack plate 77 having the rack teeth 78 thereon adapted to be engaged by the pinion 76. The guide track 57 is more sinuous than the guide track 28 of the previous embodiment in that it has a substantially vertical lower portion 79 curving into a substantially horizontal center portion 81 terminating in a substantially vertical upper portion 82.

Figure 1D:
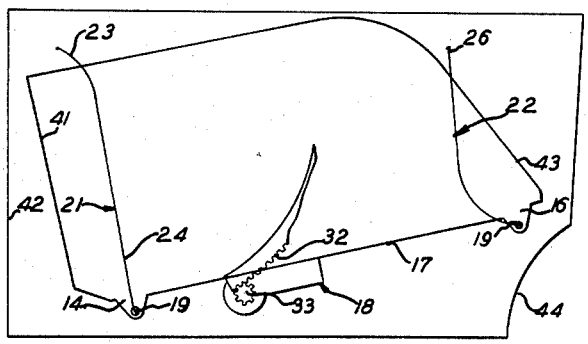

The movement pattern of the window panel is substantially the same as that shown in Figs. 1b, 1c and 1d.

The effect of the coaction between the curved track member 54 and the sinuous guide track 57 is two fold. First, the two track curvatures are so related that a substantially uniform motion is achieved as the window is tilted fore and aft as it is raised or lowered. In the previously described embodiment, the movement appears at times to be slightly irregular or jerky. Second, the gradually inclined center portion 81 of the guide track 57 prevents any appreciable loss of mechanical advantage as the pivot fulcrum of the window panel is shifted from one end to the other. With regard to Fig. 1c, it will be noted that in the previous embodiment substantially the panel and the motor unit is on the intermeshed pinion and rack teeth at this point. In the present embodiment the guide track center portion 81 supports the dead weight of the panel and motor unit during the transfer of the pivot fulcrum from the lower end of the guide 53 to the upper end of the guide track 52 or conversely, depending on whether the window is being raised or lowered.

Although the foregoing advantages are obtained, the structure is somewhat more expensive to manufacture, as will be readily apparent.

What is claimed is:

1. In an automobile body structure having a window opening, a window well therebelow, and a transparent panel movable into and out of housed position within said well; a support structure attached to said panel within said well, guide means mounted within said well, means coupling said support structure to said guide means, said guide means comprising curved track members adapted to control the movement of said panel so as to provide predetermined deviation from straight line movement to thereby permit said panel to circumvent body structure parts preventing straight line movement to and from said well, at least one of said curved track members being provided with drive engageable means, motor means, and means slidably supporting said motor means on said support structure for movement longitudinally of said panel, said motor means having drive means coupled thereto and in engagement with said drive engageable means, the curvature of said one curved track member permitting said drive means to remain in operative engagement with said drive engageable means as said panel is moved into and out of said opening and as said motor means travels longitudinally therebeneath.

2. In an automobile body structure having a window opening, a window well therebelow, and a transparent panel movable into and out of housed position within said well; a support structure attached to said panel within said well, guide means mounted within said well, means coupling said support structure to said guide means, said guide means comprising curved track members adapted to control the movement of said panel so as to provide predetermined deviation from straight line movement to thereby permit said panel to circumvent body structure parts preventing straight line movement to and from said well, at least one of said curved track members being provided with drive engageable means, motor means, said support structure being provided with a longitudinally extending track member therebeneath, and means slidably attaching said motor means to said track member, said motor means having drive means coupled thereto and in engagement with said drive engageable means, the curvature of said one curved track member permitting said drive means to remain in operative engagement with said drive engageable means as said panel is moved into and out of said opening and as said motor means travels longitudinally therebeneath.

3. In an automobile body structure having a window opening, a window well therebelow, and a transparent panel movable into and out of housed position within said well; a support structure attached to said panel within said well, guide means mounted within said well, said guide means comprising a guide track positioned adjacent each longitudinal end and another guide track positioned intermediate the ends of said well, means coupling said support means to said guide tracks, said guide tracks being curved to control the movement of said panel so as to provide predetermined deviation from straight line movement to and from said well, said intermediately positioned guide track being provided with drive engageable means, motor means, said support structure being provided with a longitudinally extending track member therebeneath, and means slidably attaching said motor to said track member, said motor means having drive means coupled thereto and in engagement with said drive engageable means, the curvature of said intermediately positioned track permitting said drive means to remain in operative engagement with said drive engageable means as said panel is moved into and out of said opening and as said motor means travels longitudinally therebeneath.

4. In an automobile body structure having a window opening, a window well therebelow, and a transparent panel movable into and out of housed position within said well; a support structure attached to said panel within said well, guide means mounted within said well, means coupling said support frame to said guide means, said guide means comprising curved track members controlling the movement of said panel to provide bodily shifting and tilting movement in a longitudinal direction to thereby permit said panel to circumvent body structure projections preventing straight line movement to and from said well, one of said track members being provided with drive engageable means, motor means, and means slidably supporting said motor means on said support structure for movement longitudinally of said panel, said motor means having drive means coupled thereto and in engagement with said drive engageable means for moving said panel, the curvature of said one track controlling the position of said motor means beneath said panel to provide maximum lift effort on that part of the panel least vertically supported by said guide means during its travel into and out of said well.

5. In an automobile body structure having a window opening, a window well therebelow, and a transparent panel movable into and out of housed position within said well, said guide means comprising side guide tracks positioned adjacent each longitudinal end and another guide track positioned intermediate the ends of said well, means coupling said support means to said guide tracks, said side guide tracks being curved to control the movement of said panel to provide bodily shifting and tilting movement in a longitudinal direction to thereby permit said panel to circumvent body structure projections preventing straight line movement into and out of said well, said intermediately positioned guide track being provided with drive engageable means, motor means, said support structure being provided with a longitudinally extending track member therebeneath, and means slidably attaching said motor to said track member for movement longitudinally of said panel, said motor means having drive means coupled thereto and in engagement with said drive engageable means to move said panel, the curvature of said intermediately positioned guide track controlling the position of said motor means beneath said panel to provide maximum lift effort on that portion of the panel least vertically supported by said guide means during its travel into and out of said well.

6. In an automobile body structure having a window opening, a window well therebelow, and a transparent panel movable into and out of housed position within said well, guide means mounted within said well, said guide means comprising side guide tracks positioned adjacent each longitudinal end and another guide track positioned intermediate the ends of said well, means coupling said support means to said guide tracks, said side guide tracks being curved to control the movement of said panel to provide bodily shifting and titlting movement in a longitudinal direction to thereby permit said panel to circumvent body structure projections preventing straight line movement into and out of said well, said intermediately positioned guide track being provided with drive engageable means, motor means, said support structure being provided with a longitudinally extending curved track member therebeneath, and means slidably attaching said motor to said track member for movement longitudinally of said panel, said motor means having drive means coupled thereto and in engagement with said drive engageable means to move said panel, the movement of said motor means relative to the travel path of said panel being controlled by said intermediately positioned guide track and said curved track member whereby the lift effort exerted by said motor means is substantially a maximum on that portion of the panel least supported vertically by said guide means as it travels into and out of said well.

References Cited in the file of this patent

UNITED STATES PATENTS

| | | |
|---|---|---|
| 2,160,099 | Zeligman | May 30, 1939 |
| 2,215,363 | Rupple | Sept. 17, 1940 |
| 2,336,530 | Chandler | Dec. 14, 1943 |
| 2,593,360 | Sulkowski | Apr. 15, 1952 |
| 2,651,541 | Surles | Sept. 8, 1953 |
| 2,763,508 | Gelfand | Sept. 18, 1956 |
| 2,798,761 | Himka | July 9, 1957 |
| 2,803,492 | Wright | Aug. 20, 1957 |
| 2,805,886 | Semar | Sept. 10, 1957 |